July 31, 1934.  S. BEST  1,968,734

SEWER PIPE CONSTRUCTION

Original Filed March 21, 1932

Inventor:
Seward Best,
By Danforth, Lee, Christen & Wiles,
Attys.

Patented July 31, 1934

1,968,734

UNITED STATES PATENT OFFICE 1,968,734

SEWER PIPE CONSTRUCTION

Seward Best, Quincy, Ill., assignor to J. A. S. Ehart and W. H. Henning, copartners doing business under the firm name and style of A-B-C Manufacturing Co.

Refiled for abandoned application Serial No. 600,336, March 21, 1932. This application June 11, 1934, Serial No. 730,131

3 Claims. (Cl. 285—115)

This invention relates to improvements in sewer pipe construction and, more especially, to means for lessening or preventing the growth of roots in underground sewer pipes.

This application is an exact duplicate of application, Serial No. 600,336, filed March 21, 1932, which was formally allowed November 29, 1932, and which thereafter became technically abandoned.

It is well known that in laying sewer pipes underground, it is practically impossible to make the joints between sections absolutely tight permanently. In any event, in underground sewer pipes there are frequently found root-permeable joints. By this, I mean that the joint is of such a nature that the root of a tree or other plant is able to enter the joint. The flow of sewage in underground sewer pipes contributes greatly to the entrance of such roots through such joints. Such sewage furnishes moisture and fertilization to the growth so that roots are attracted to the joint if there is any leakage. Such roots frequently are able to go through the joint and enter the sewer pipe. Inside the sewer pipe it is quite common for the root growth to enlarge and propagate until the normal flow of sewage in the pipe is interfered with.

One of the features of my invention is the provision of a means or method for lessening or preventing the entry of roots in the joints of sewer pipes and the growth of roots inside.

Other features and advantages of my invention will appear more fully as I proceed with my specification.

In those forms of devices embodying the features of my invention shown in the accompanying drawing—

Figure 1:
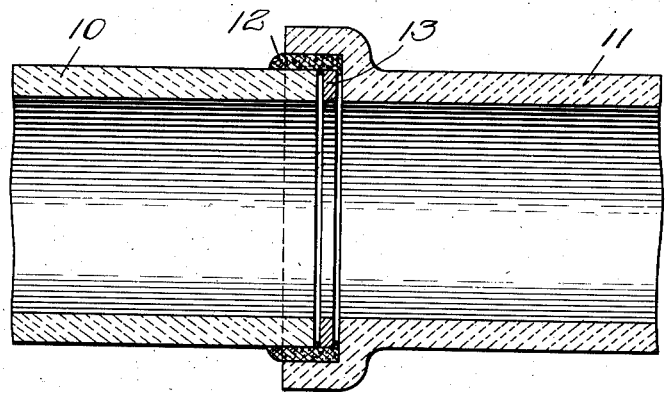
Figure 2:
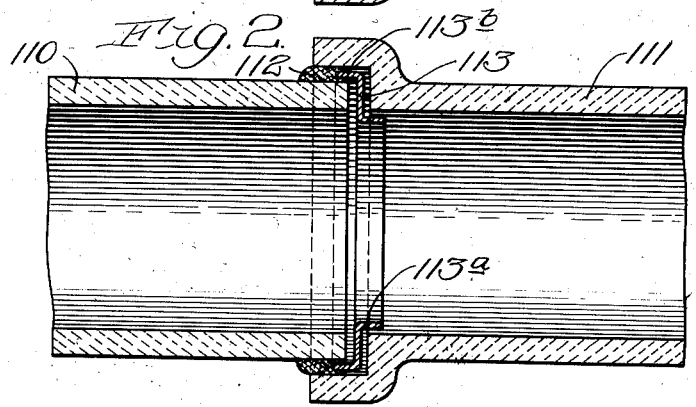
Figure 3:
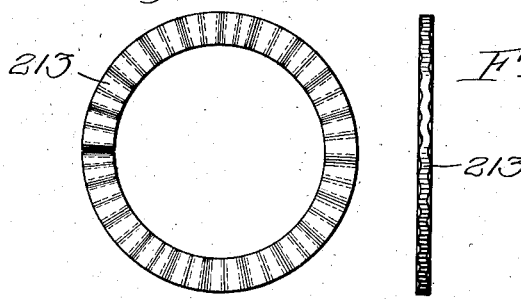
Figure 4:
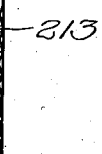

Figure 1 is a vertical section of a sewer pipe joint; Fig. 2 is a similar view showing a modified form; Fig. 3 is a view in end elevation of a form of ring that could be used in the practice of my invention; and Fig. 4 is a similar view of said ring in side elevation.

As shown in the drawing, 10 and 11 may indicate adjacent sections of sewer pipe, for example, tile pipe of well-known construction. The joints between such sections are closed in a variety of ways. For example, it is common to use cement 12 at such joints. Such joints, however, in the usual laying of underground sewer pipe are often root-permeable. The joint may not be absolutely tight in the first instance, or it may become loosened with time. If there is a slight leakage of sewage, the moisture promotes the growth of roots in the vicinity of the joint, with the result that the roots soak the moisture and permeate the joint itself. The entry of the roots frequently opens the joint wider so that more roots enter. In any event, if any entry of roots is permitted, such roots will enter the pipe and upon reaching the sewage, will increase in growth as mentioned above. Of course, if the joint is absolutely tight and absolutely dry, no root will enter in the first place. It is to be understood that my invention is in no way related to such a joint. My invention applies only to the kind of joint that will permit some entry of root growth in the first place and for convenience, I shall refer to this kind of a joint as a root-permeable joint. It is to be understood, therefore, that the joint shown in Fig. 1, although closed by the cement 12, is in fact a root-permeable joint. That is, I mean there will be some slight leakage of moisture through the joint or some slight opening through which a root can enter. Such leakage or opening, however, is too small to show in the drawing. It is to be understood nevertheless that the joint of Fig. 1, although shown as closed by the cement 12, is in fact a root-permeable joint. Likewise, the joint shown in Fig. 2, which will be described more in detail hereinafter, is also a root-permeable joint.

In the practice of my invention, I place in the joint a ring between the adjacent sections, said ring containing material adapted to set up a corrosive action when attacked by sewage, such corrosive action killing or injuring the growth of roots. For example, the ring may be made of copper which, when attacked by sewage, corrodes or otherwise acts chemically with the sewage to produce a substance which will injure or kill vegetation and root growth. In Fig. 1, such ring is indicated by 13 and the same may be, for example, a copper ring. It is to be particularly noted that this ring need not serve as a seal or gasket to make a tight joint. It need not function as a gasket at all. The usual cement 12 may be used for sealing the joint. The ring 13 is inserted in the joint merely for the purpose of setting up the action above referred to which is injurious to root growth. The ring need not be copper but may be made of any material or contain any substance which, when acted upon by sewage, will produce some product or action injurious to vegetation.

The practice of the invention as exemplified in Fig. 2 is substantially the same as above described. 110 and 111 indicate sections of sewer pipe joined together by the usual cement 112. In this joint there is used a ring 113 having inner and outer oppositely turned cylindrical flanges 113ᵃ and 113ᵇ. The ring 113 may be copper or other material, as above described.

In Figs. 3 and 4 I have illustrated a form of ring that may be made out of a single strip of sheet metal. As here shown, for example, the ring may be made out of a strip of copper corrugated to form the complete ring 213. The corrugations are radially arranged and deeper on the inner edge of the ring than the outer in order to give the desired curvature.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In combination with two sections of soil sewer pipe fastened together by a root-permeable joint, a ring between said sections in said joint and exposed to sewage flowing in the pipe, said ring containing material adapted to set up a corrosive action when contacted by sewage, whereby roots entering said joint will be killed.

2. Apparatus as claimed in claim 1, in which the ring is formed of a single strip of material with tapered radial corrugations.

3. Apparatus as claimed in claim 1, in which the ring contains a cupreous product.

SEWARD BEST.